Patented Nov. 27, 1934

1,982,197

UNITED STATES PATENT OFFICE 1,982,197

PRODUCING MONOCARBOXYLIC ACIDS

Johannes Brode, Ludwigshafen-on-the-Rhine, and Adolf Johannsen, Mannheim, Germany, assignors to I. G. Farbenindustrie Aktiengesellschaft, Frankfort-on-the-Main, Germany, a corporation of Germany No Drawing. Application April 21, 1928, Serial No. 271,971. In Germany November 27, 1925

8 Claims. (Cl. 260—108)

The present invention relates to the production of monocarboxylic acids from dicarboxylic acids or their anhydrides.

The application is a continuation in part of our application Ser. No. 149,520, filed November 19, 1926, now Patent No. 1,955,050, dated April 17, 1934, in which application we have described and claimed a process for the manufacture of monocarboxylic acids from dicarboxylic acids with the aid of catalysts capable of splitting off carbon dioxid. In the said process dicarboxylic acids or their anhydrides, the latter together with water vapor, which however, is preferably also added when starting from dicarboxylic acids, are passed, alone or together with other gases, over the aforesaid catalysts at temperatures between about 250° and 500° C., preferably between 300° and 450° C. As stated in the aforesaid application Ser. No. 149,520, cadmium oxid is a particularly valuable catalyst, whether employed alone or in conjunction with other compounds, such for example as oxids of other metals and the like.

The reaction is advantageously carried out with an excess of water vapor over the quantity theoretically required; however, the process may also be carried out by exposing the vapor mixture formed by heating dicarboxylic acids (which mixture consists probably of the dicarboxylic acid, its anhydride and water vapor) directly over the catalyst. When starting from dicarboxylic acid anhydrides, an addition of water vapor to the anhydride vapor is necessary, as stated above.

The operation with a gas or air current containing water vapor offers often advantages over the use of water vapor alone, as, for example, in the conversion of phthalic anhydride into benzoic acid, the concentration of the water vapor and the temperature at which the separation of the reaction products takes place, may be so chosen as to obtain the reaction product directly in a solid, practically dry form; this results in the purification and further use of the reaction product being much facilitated.

The dicarboxylic acid anhydrides employed as initial materials in the process above mentioned, for example phthalic anhydride, maleic anhydride and the like, may be obtained by the catalytic oxidation of vapors of hydrocarbons or their derivatives such as naphthalene, naphthol, benzene, phenol and the like.

We have further found that when the dicarboxylic acid anhydrides are prepared by catalytic reactions in the vapor phase, such for example as have been mentioned before, it is not necessary to separate the anhydride from the reaction mixture, but the latter may be passed directly or after an addition of water vapor has been made, over the catalyst comprising cadmium oxid. This method of working is of particular advantage when the anhydrides are prepared by the catalytic oxidation of hydrocarbons or derivatives thereof.

The following example will further illustrate the nature of this invention which, however, is not limited thereto.

*Example*

A gaseous reaction mixture comprising nitrogen as a carrying gas and containing per cubic meter thereof about 30 grams of phthalic anhydride vapor and 40 grams of water vapor is passed at 300° C. over an intimate mixture of cadmium oxid and alumina precipitated on to pumice. On cooling the reaction mixture, benzoic acid is separated in a good yield as a white dry product.

What we claim is:

1. The process of producing monocarboxylic acids which comprises passing the vapors of a dicarboxylic acid at between about 250° and about 500° C. over a catalyst essentially comprising cadmium oxid.

2. The process of producing monocarboxylic acids which comprises passing the vapors of a dicarboxylic acid together with water vapor at between about 250° and about 500° C. over a catalyst essentially comprising cadmium oxid.

3. The process of producing monocarboxylic acids which comprises passing the vapors of a dicarboxylic acid anhydride together with water vapor at between about 250° and about 500° C. over a catalyst essentially comprising cadmium oxid.

4. The process of producing monocarboxylic acids which comprises passing the vapors of a dicarboxylic acid anhydride together with water vapor at between about 300° and about 450° C. over a catalyst essentially comprising cadmium oxid.

5. The process of producing benzoic acid which comprises passing phthalic anhydride vapor together with water vapor at between about 250° and about 500° C. over a catalyst essentially comprising cadmium oxid.

6. The process of producing benzoic acid which comprises passing phthalic anhydride vapor together with water vapor over a mixture essentially comprising cadmium oxid and aluminium oxid precipitated on pumice at about 300° C.

7. The process of producing monocarboxylic acids which comprises passing the gas mixture resulting from the catalytic manufacture of a dicarboxylic anhydride in the vapor phase at between about 250° and about 500° C. over a catalyst essentially comprising cadmium oxid.

8. The process of producing benzoic acid which comprises subjecting naphthalene vapor to catalytic oxidation to phthalic anhydride and passing the resulting gas mixture at between about 250° and about 500° C. over a catalyst essentially comprising cadmium oxid.

JOHANNES BRODE.
ADOLF JOHANNSEN.